United States Patent
Butler et al.

(10) Patent No.: US 11,068,791 B2
(45) Date of Patent: Jul. 20, 2021

(54) PROVIDING RECOMMENDATIONS UTILIZING A USER PROFILE

(71) Applicant: International Business Machines Corporation, Armonk, NY (US)

(72) Inventors: Eric K. Butler, San Jose, CA (US); Anca A. Chandra, Los Gatos, CA (US); Pawan R. Chowdhary, San Jose, CA (US); Susanne M. Glissmann-Hochstein, San Jose, CA (US); Divyesh Jadav, San Jose, CA (US); Shun Jiang, San Jose, CA (US); Sunhwan Lee, Menlo Park, CA (US); Guangjie Ren, Belmont, CA (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 15/265,714

(22) Filed: Sep. 14, 2016

(65) Prior Publication Data
US 2018/0075355 A1 Mar. 15, 2018

(51) Int. Cl.
*G06N 5/04* (2006.01)

(52) U.S. Cl.
CPC ..................... *G06N 5/04* (2013.01)

(58) Field of Classification Search
CPC ............. G06N 5/00–048; G06Q 50/00; G06Q 50/10–14; G06Q 50/30
USPC ......................................... 706/45–61; 705/6
See application file for complete search history.

(56) References Cited

U.S. PATENT DOCUMENTS

| 8,725,612 | B2 | 5/2014 | Mundinger et al. |
| 8,949,242 | B1* | 2/2015 | Lin ........................ G06F 16/36 |
| | | | 707/739 |
| 9,070,108 | B2 | 6/2015 | Erling et al. |
| 9,117,182 | B2 | 8/2015 | Bapna et al. |
| 9,864,778 | B1* | 1/2018 | Strand ................. G06F 16/2457 |
| 2004/0023666 | A1* | 2/2004 | Moon ..................... H04L 29/06 |
| | | | 455/456.1 |
| 2006/0173872 | A1* | 8/2006 | Koike ................ G06Q 30/0631 |
| 2006/0174275 | A1* | 8/2006 | Gutta ................. H04N 21/4756 |
| | | | 725/46 |
| 2008/0209320 | A1* | 8/2008 | Mawhinney .......... G06F 16/248 |
| | | | 715/700 |

(Continued)

FOREIGN PATENT DOCUMENTS

KR 20020007790 A 1/2002

OTHER PUBLICATIONS

Stefan Savev, "Cosine Similarity Part 1: The Basics", Mar. 29, 2015, retrieved from: http://web.archive.org/web/20160606182923/https://stefansavev.com/blog/cosine-similarity/.*

(Continued)

*Primary Examiner* — Jue Louie
(74) *Attorney, Agent, or Firm* — Zilka-Kotab, P.C.

(57) ABSTRACT

A computer-implemented method according to one embodiment includes creating a profile for a user, the profile including one or more default aspects created automatically by a system and one or more custom aspects created in response to textual input by the user, comparing event data to the profile, and providing a recommendation to the user, based on the comparing.

19 Claims, 8 Drawing Sheets

(56) References Cited

U.S. PATENT DOCUMENTS

| | | | |
|---|---|---|---|
| 2009/0171760 A1* | 7/2009 | Aarnio | G06Q 30/0269 705/14.66 |
| 2010/0161620 A1* | 6/2010 | Lamere | G06F 16/68 707/749 |
| 2010/0169131 A1 | 7/2010 | Robertson | |
| 2012/0046018 A1* | 2/2012 | Bunting | H04L 67/36 455/414.2 |
| 2012/0084000 A1 | 4/2012 | Wang et al. | |
| 2014/0032358 A1* | 1/2014 | Perkowitz | H04W 4/21 705/26.7 |
| 2014/0143352 A1* | 5/2014 | Yegnashankaran | H04L 51/20 709/206 |
| 2014/0156646 A1* | 6/2014 | Brust | G06F 3/0481 707/722 |
| 2014/0156746 A1* | 6/2014 | Wheatley | H04L 67/22 709/204 |
| 2014/0289239 A1* | 9/2014 | Kanigsberg | G06Q 30/0625 707/733 |
| 2014/0372425 A1* | 12/2014 | Ayoub | G06F 16/9535 707/727 |
| 2015/0276410 A1 | 10/2015 | Lamoriniere et al. | |
| 2015/0324099 A1* | 11/2015 | Tang | G06F 3/04847 715/716 |
| 2016/0042432 A1* | 2/2016 | Wenig | G06F 16/337 705/26.7 |
| 2017/0109446 A1* | 4/2017 | Wu | G06F 7/02 |
| 2017/0139546 A1* | 5/2017 | Hartwell | G06Q 30/0277 |
| 2017/0328725 A1* | 11/2017 | Schlesinger | G01C 21/3461 |
| 2018/0013861 A1* | 1/2018 | Howard | H04L 67/36 |
| 2018/0053142 A1* | 2/2018 | Martin | G06F 16/3326 |

OTHER PUBLICATIONS

Chiang et al., "User-Adapted Travel Planning System for Personalized Schedule Recommendation," Information Fusion, vol. 21, 2015, pp. 3-17.

Anonymous, Method for Travel Plan based on Social Network Contribution and Sentiment Analysis, Prior Art Database Technical Disclosure, IP.com, 2014, pp. 1-4.

* cited by examiner

400 a Profile is Created for a User, the Profile Including One or More Default Aspects Created Automatically by a System and One or More Custom Aspects Created in Response to Textual Input by the User — 402

Event Data is Compared to the Profile — 404 a Recommendation is Provided to the User, Based on the Comparing — 406

PROVIDING RECOMMENDATIONS UTILIZING A USER PROFILE

BACKGROUND

The present invention relates to profile creation, and more specifically, this invention relates to providing a recommendation to a user utilizing a profile of the user.

The ability to provide accurate recommendations to users is a useful tool for providers of services and products. However, current recommendation systems fail to account for many user attributes when determining a recommendation to be provided to a user.

SUMMARY

A computer-implemented method according to one embodiment includes creating a profile for a user, the profile including one or more default aspects created automatically by a system and one or more custom aspects created in response to textual input by the user, comparing event data to the profile, and providing a recommendation to the user, based on the comparing.

According to another embodiment, a computer program product for providing recommendations utilizing a user profile comprises a computer readable storage medium having program instructions embodied therewith, wherein the computer readable storage medium is not a transitory signal per se, and where the program instructions are executable by a processor to cause the processor to perform a method comprising creating a profile for a user, utilizing the processor, the profile including one or more default aspects created automatically by a system and one or more custom aspects created in response to textual input by the user, comparing event data to the profile, utilizing the processor, and providing, utilizing the processor, a recommendation to the user, based on the comparing.

A system according to another embodiment includes a processor, and logic integrated with the processor, executable by the processor, or integrated with and executable by the processor, the logic being configured to create a profile for a user, the profile including one or more default aspects created automatically by a system and one or more custom aspects created in response to textual input by the user, compare event data to the profile, and provide a recommendation to the user, based on the comparison.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 illustrates a method for providing recommendations utilizing a user profile, in accordance with one embodiment.

DETAILED DESCRIPTION

Figure 1:
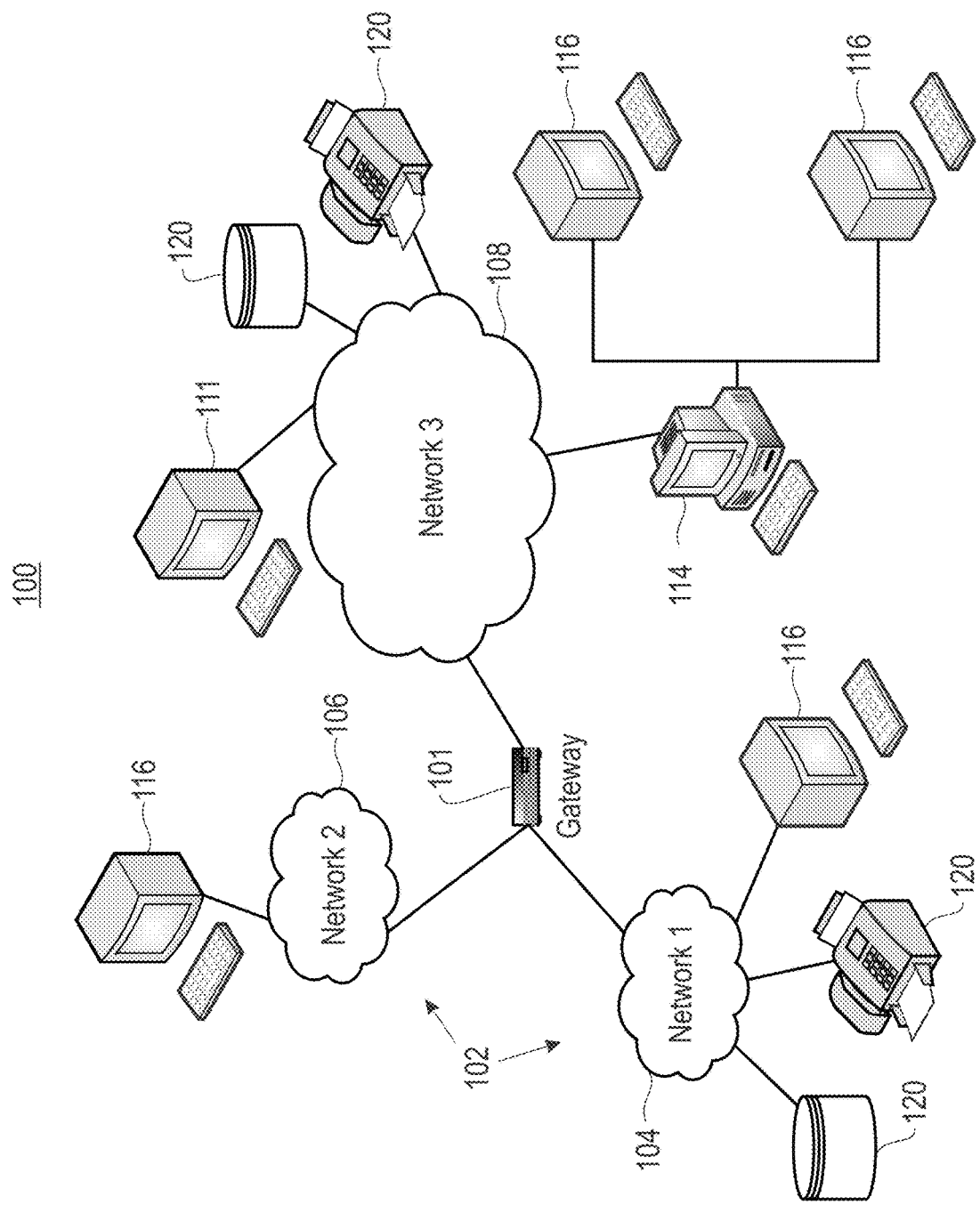
FIG. 1 illustrates a network architecture, in accordance with one embodiment.

The following description discloses several preferred embodiments of systems, methods and computer program products for providing recommendations utilizing a user profile. Various embodiments provide a method to create and utilize a profile to assist in providing accurate recommendations to a user.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing recommendations utilizing a user profile.

In one general embodiment, a computer-implemented method includes creating a profile for a user, the profile including one or more default aspects created automatically by a system and one or more custom aspects created in response to textual input by the user, comparing event data to the profile, and providing a recommendation to the user, based on the comparing.

In another general embodiment, a computer program product for providing recommendations utilizing a user profile comprises a computer readable storage medium having program instructions embodied therewith, wherein the computer readable storage medium is not a transitory signal per se, and where the program instructions are executable by a processor to cause the processor to perform a method comprising creating a profile for a user, utilizing the processor, the profile including one or more default aspects created automatically by a system and one or more custom aspects created in response to textual input by the user, comparing event data to the profile, utilizing the processor, and providing, utilizing the processor, a recommendation to the user, based on the comparing.

In another general embodiment, a system includes a processor, and logic integrated with the processor, executable by the processor, or integrated with and executable by the processor, the logic being configured to create a profile for a user, the profile including one or more default aspects created automatically by a system and one or more custom aspects created in response to textual input by the user, compare event data to the profile, and provide a recommendation to the user, based on the comparison.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
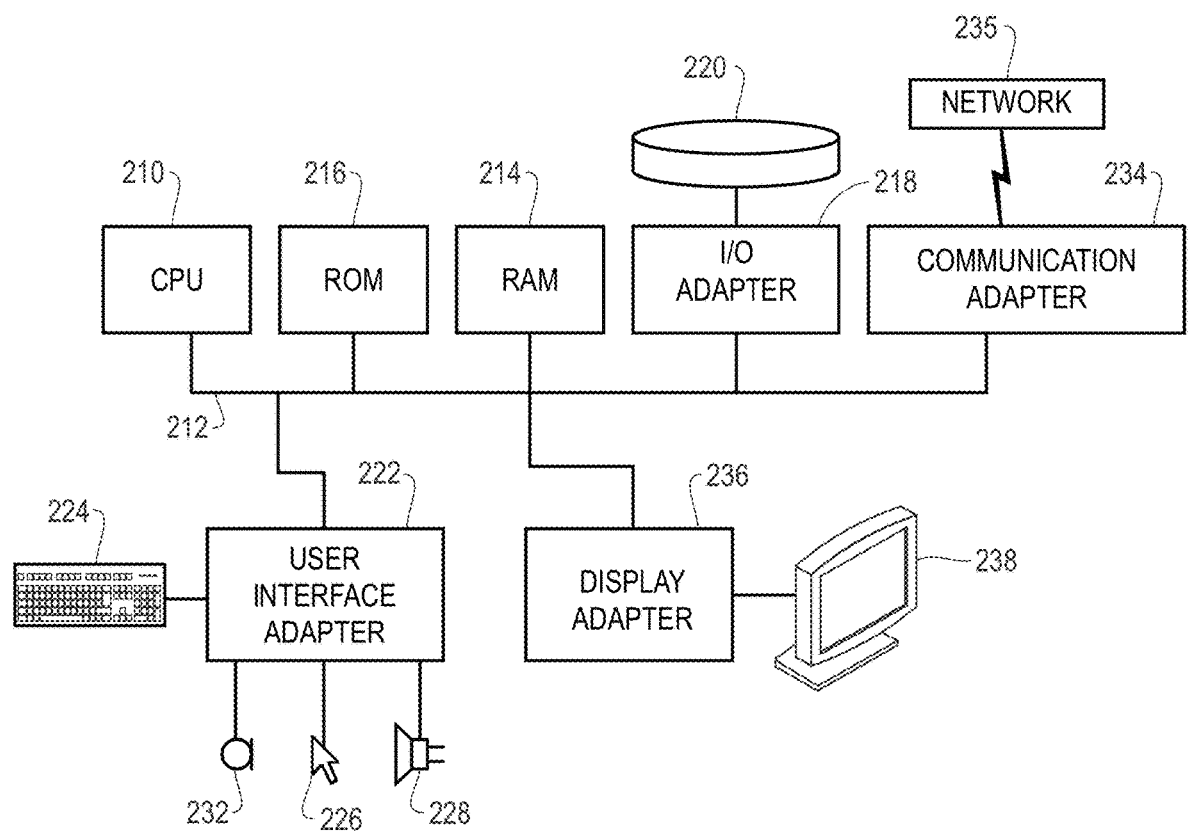
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
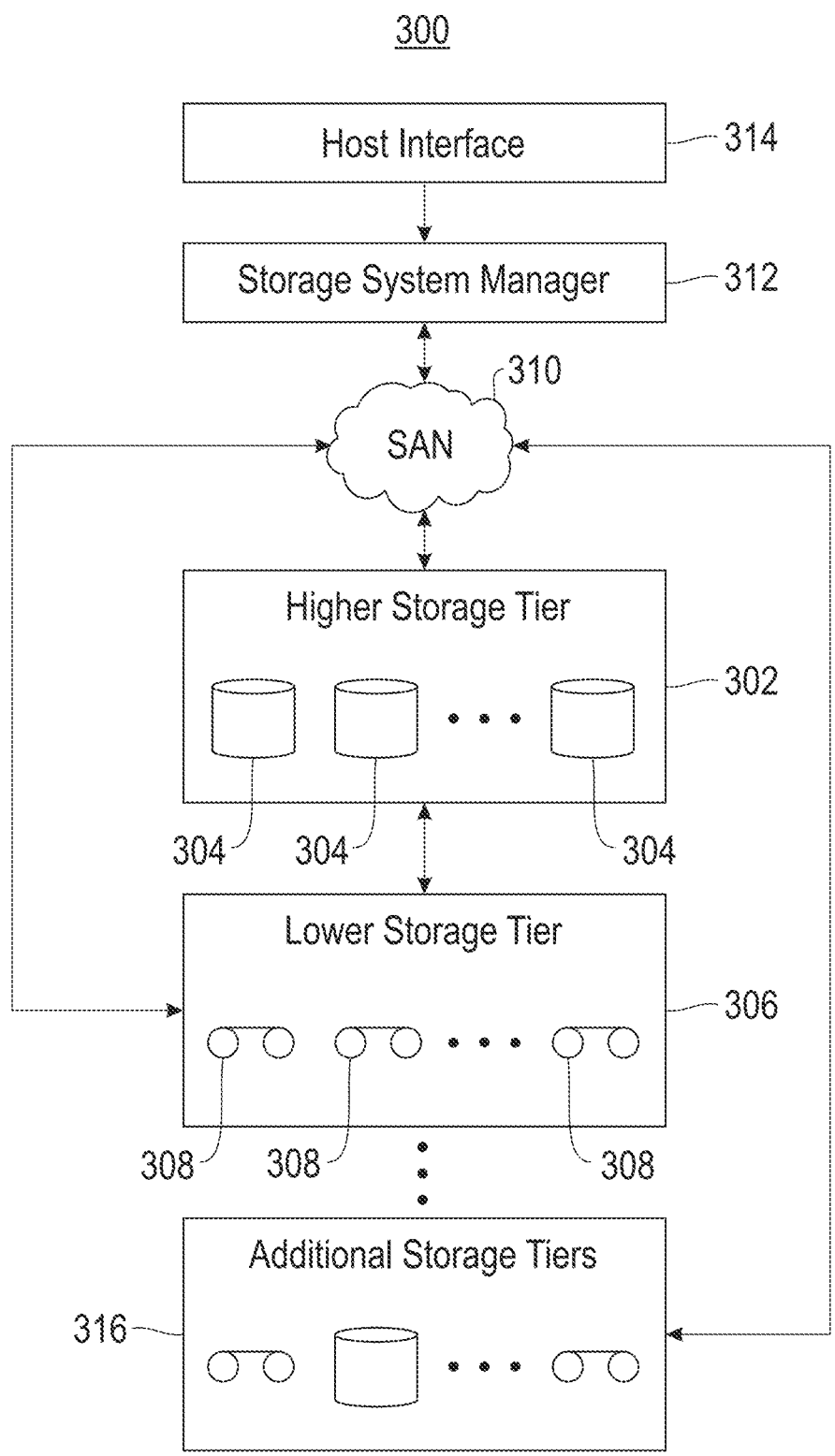
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Now referring to FIG. 4, a flowchart of a method 400 is shown according to one embodiment. The method 400 may be performed in accordance with the present invention in any of the environments depicted in FIGS. 1-3 and 5-8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a profile is created for a user, the profile including one or more default aspects created automatically by a system and one or more custom aspects created in response to textual input by the user. In one embodiment, the profile may be created in response to a request from the user. For example, the profile may be created by a system in response to a request to create the profile received at the system from the user (e.g., utilizing a graphical user interface (GUI), etc.). In another embodiment, the default aspects may include default information (e.g., one or more default characteristics, dimensions, etc.) created automatically by a system. In another example, the profile may be a travel profile for a user, and the default information may include a default aspect indicating a preference for low cost travel, a default aspect indicating a desire to travel by any mode of transportation, etc.

Additionally, in one embodiment, creating the profile for the user may include adding customized information to the profile in response to input from the user. For example, the one or more custom aspects (e.g., characteristics, dimensions, etc.) may be created in response to textual input from the user. In another embodiment, the textual description may be received from the user, where the textual description may include a bag of words, a paragraph of text, or any other textual data. In yet another embodiment, upon receiving the textual input, the system may parse the textual data, the system may create a custom aspect for the user within the profile, based on the parsing, and the system may save the textual data in association with the custom aspect.

Further, in one embodiment, an indication as to whether the textual input is positive or negative may also be received from the user (or may be derived from the textual input itself by analyzing the textual input). In another embodiment, the indication may be stored with the textual input within the profile in association with the custom aspect.

Further still, in one embodiment, one or more aspects within the profile created for the user may have an associated weight. For example, each aspect within the profile (both default and custom aspects) may have an associated weight. In another example, default aspects within the profile may have a default weight. In still another example, custom aspects within the profile may have a default weight or may have a weight assigned to them by the user (e.g., using input from the user via a GUI, etc.).

Further, as shown in FIG. 4, method 400 may proceed with operation 404, where event data is compared to the profile. In one embodiment, the event data may include a description of one or more events that is received by the system from one or more sources. For example, the event data may include a textual description of a news event, a health event, a travel event, etc. In another embodiment, the source of the event data may include a blog post, a social media post, a website, a streaming textual data update, etc.

In addition, in one embodiment, comparing the event data to the profile may include performing a textual analysis of both the event data and each aspect of the profile. For example, a level of correspondence (e.g., a relationship magnitude, etc.) between the event data and each aspect of the profile may be determined utilizing one or more measurements (e.g., a cosine measurement, etc.).

For example, a vector space of phrases and/or words may be created within the textual data provided by the user. Additionally, in this vector space, the textual data may be placed at a point in the vector space where each dimension corresponds to a word or term. Further, a value given to a dimension may include a number of occurrences of that word/term within the description. Further still, two points in the vector space may be normalized to create a sphere, and a cosine of the angle between the two points may be measured to determine a value indicating how close the two elements are together. In another embodiment, comparing the event data to the profile may result in a quantitative measurement for each aspect indicating the level of correspondence between the event data and that aspect of the profile.

In addition, as shown in FIG. 4, method 400 may proceed with operation 406, where a recommendation is provided to the user, based on the comparing. In one embodiment, providing the recommendation may include reviewing the quantitative measurements. For example, the results of the comparing may be submitted to and reviewed by a recommender engine. In another example, a comparison engine within the system may send quantitative measurements indicating the level of correspondence between the event data and each aspect of the profile to a recommender engine. In another embodiment, one or more weights within the profile may be provided to the recommender engine. For example, a weight associated with each aspect of the profile may be sent to the recommender engine.

Further still, in one embodiment, the recommendation may be determined utilizing the one or more weights as well as the quantitative measurements. For example, for each of the plurality of aspects (e.g., default and custom aspects, etc.), the quantitative measurement associated with that aspect may be modified according to a weight associated with the aspect, and the modified measurement may be compared against one or more thresholds. In another example, a sum of the modified measurements may be determined and compared against one or more thresholds.

In another embodiment, the recommender engine may have one or more predetermined topics associated with one or more measurements. For example, the recommender engine may associate a topic such as "danger" or "delay" with a certain quantitative measurement for a particular aspect.

Also, in one embodiment, the recommendation may include one or more proposed actions. For example, the recommendation may include one or more proposed actions associated with an individual aspect, based on the results of the comparison of the modified measurement of the aspect to the one or more thresholds. In another embodiment, the recommendation may include one or more proposed actions associated with the profile itself, based on the results of the comparison of the sum of the modified measurements to the one or more thresholds.

For example, for each aspect, if it is determined that a modified measurement exceeds the one or more thresholds, one or more proposed actions associated with the aspect for which the modified measurement is calculated may be included in the recommendation that is provided to the user. In another embodiment, the one or more proposed actions may include one or more options that are selectable by the user, such that an option is implemented, and the proposed action is performed, upon selection of the option by the user. In another example, the one or more proposed actions may include one or more suggested actions to be performed by the user independently of the system.

Additionally, in one embodiment, a rationale associated with the recommendation may be provided to the user. For example, the rationale may be provided to the user in response to a request for an explanation of the recommendation by the user. In another embodiment, the rationale may include a description or link to one or more events within the event data, a description of one or more aspects, a description of one or more weights, etc. For example, the rationale may include a description of the event data that was compared to the profile. In another example, the rationale may include a description of one or more aspects having a level of correspondence to the event data that exceeds a predetermined threshold, etc.

Further, in one embodiment, one or more actions performed by the user in response to the recommendation may be determined. For example, the system may monitor the user and may determine whether the user performs one or more of the proposed actions suggested to the user via the recommendation, or whether the user performs one or more actions that are not suggested to the user via the recommendation.

Further still, in one embodiment, the profile may be adjusted in response to the determination of the one or more actions performed by the user. For example, one or more weights associated with one or more aspects within the profile may be changed, in response to the determination of the one or more actions performed by the user. In another example, if it is determined that the user performs an action proposed to the user via the recommendation, one or more weights associated with one or more aspects that prompted the recommendation may be increased. In yet another example, if it is determined that the user does not perform an action proposed to the user via the recommendation, one or more weights associated with one or more aspects that prompted the recommendation may be decreased. In another embodiment, the user may review and manually adjust the weights associated with each of the aspects of the profile of the user.

In this way, the profile for the user may be tailored specifically to the user, and the profile may directly affect recommendations provided to the user. Further, the profile may be fine-tuned to the user by monitoring the way in which the user responds to the provided recommendations.

Figure 5:
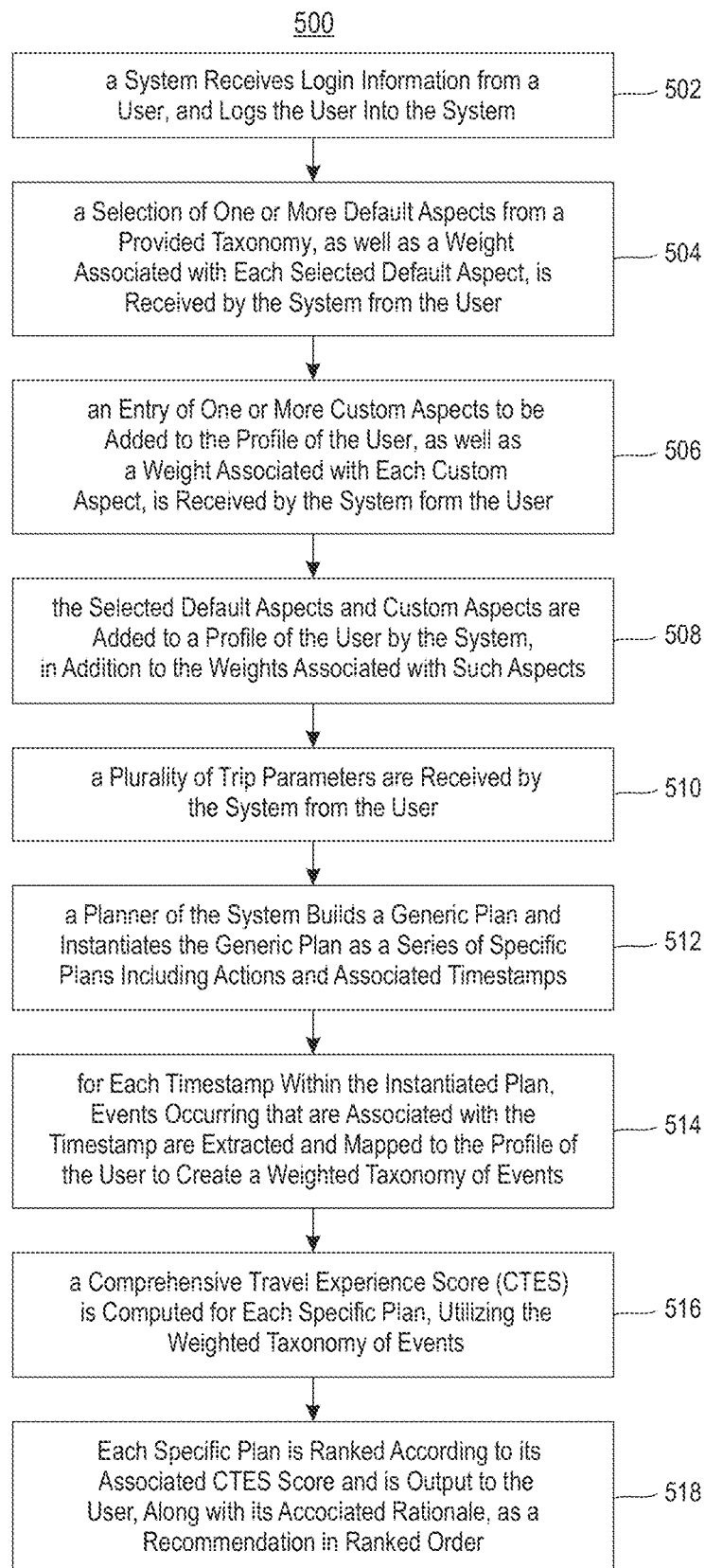
FIG. 5 illustrates a method for implementing a trip planning recommendation system, in accordance with one embodiment.

Now referring to FIG. 5, a flowchart of a method 500 for implementing a trip planning recommendation system is shown according to one embodiment. The method 500 may be performed in accordance with the present invention in any of the environments depicted in FIGS. 1-4 and 6-8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a system receives login information from a user, and logs the user into the system. In one embodiment, the user may log into the system utilizing a graphical user interface (GUI) of the system. Additionally, method 500 may proceed with operation 504, where a selection of one or more default aspects from a provided taxonomy, as well as a weight associated with each selected default aspect, is received by the system from the user.

Further, method 500 may proceed with operation 506, where an entry of one or more custom aspects to be added to the profile of the user, as well as a weight associated with each custom aspect, is received by the system from the user. In one embodiment, each custom aspect may be received by the system as an entry of textual data be the user. For example, the user may enter textual data indicating that the user does not like night travel, does not like red eye flights, has a high personal safety concern, and has an aversion to being late, and a plurality of custom aspects may be created by the system that reflect topics extracted from the entered textual data.

Further still, method 500 may proceed with operation 508, where the selected default aspects and custom aspects are added to a profile of the user by the system, in addition to the weights associated with such aspects. In one embodiment, the profile of the user may include a weighted taxonomy of events indicated by the selected default aspects and the entered custom aspects.

Also, method 500 may proceed with operation 510, where a plurality of trip parameters are received by the system from the user. In one embodiment, the trip parameters may include one or more details associated with a trip desired to be purchased and/or taken by the user. For example, the trip parameters may include a departure city and departure date as well as an arrival city and an arrival date. In another example, the trip parameters may include a trip from San Jose to Beijing, from Oct. 20-27, 2016.

In addition, method 500 may proceed with operation 512, where a planner of the system builds a generic plan and instantiates the generic plan as a series of specific plans including actions and associated timestamps. In one embodiment, the generic plan may include a general trip overview including exemplary actions to be performed on the trip. For example, the generic plan may include actions such as the following:

Taxi, Flight, Taxi, Hotel, Taxi, Flight, Taxi

In another embodiment, the instantiation of the generic plan may include a more detailed trip overview including exemplary specifics to perform each portion of the generic plan. For example, the instantiation of the generic plan may include a plurality of possible plans that include a series of tuples detailing an action and a timestamp, such as:
plan1=(taxi, Oct. 20, 2015) (us45, SFO-AMS, 8 PM Oct. 20, 2015) (us67, AMS-BJS, 10 AM Oct. 21, 2015) . . . , etc., and plan2=(taxi, Oct. 20, 2015) (united234, SFO-BJS, 6 PM Oct. 20, 2015) (taxi Oct. 21, 2015) . . . , etc.

Furthermore, method 500 may proceed with operation 514, where for each timestamp within the instantiated plan, events occurring that are associated with the timestamp are extracted and mapped to the profile of the user to create a weighted taxonomy of events. In one embodiment, the events may be identified by analyzing event data monitored by the system. For example, weather data, traffic data, news data, social media data, and other event data may be monitored by the system to identify a plurality of events, and events having a timestamp matching a timestamp within the instantiated plan may be extracted. For instance, one exemplary mapping may include:
Oct. 20, 2015: (heavy rain in SF)(accident US101)(conflict in Ukraine)(Ebola in Africa)

In another embodiment, the event data may include streaming data, such as a continuous stream of events that may include associated timestamp data (e.g., an airline strike in Greece between Feb. 20, 2016 and Feb. 27, 2016, etc.).

Further still, method 500 may proceed with operation 516, where a comprehensive travel experience score (CTES) is computed for each specific plan, utilizing the weighted taxonomy of events. In one embodiment, for each timestamp, based on the user profile, event data, and any obtained user feedback from earlier travel, the system may compute a CTES score for each plan. In another embodiment, each CTES score may have an associated rationale describing one or more events that influenced the score. For example, exemplary CTES scores and rationales for various plans may include:
plan 1=0.2—because of conflict in Ukraine
plan 2=0.8—because direct flight Also, method 500 may proceed with operation 518, where each specific plan is ranked according to its associated CTES score and is output to the user, along with its associated rationale, as a recommendation in ranked order. In this way, the user may be provided with a dynamically adaptive travel plan that satisfies travel constraints and user preferences while optimizing a CTES score, as well as an explanation as to how the CTES score affected the ranked plans.

Figure 6:
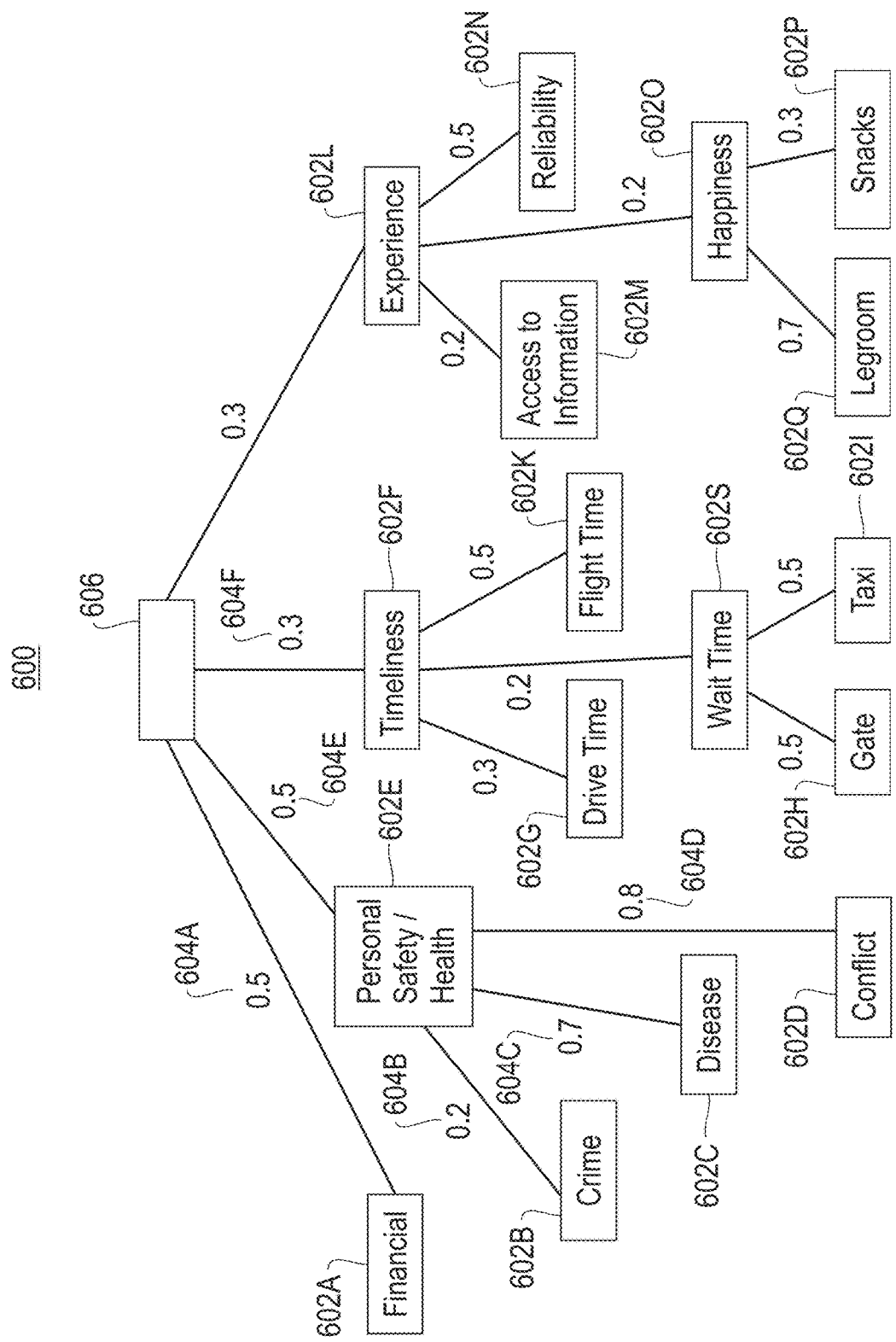
FIG. 6 illustrates an exemplary weighted profile, in accordance with one embodiment.

FIG. 6 discloses an exemplary weighted profile 600, according to one embodiment. As shown, the exemplary weighted profile 600 includes a plurality of aspects 602A-Q associated with a user 606. In one embodiment, the plurality of aspects 602A-Q may include one or more default aspects created by a system for the user. In another embodiment, the plurality of aspects 602A-Q may include one or more custom aspects created for the user in response to an input of textual data by the user. For example, the system may parse textual data input by the user, identify one or more key words based on the parsing, and may create one or more custom aspects utilizing the identified key words.

Additionally, each of the plurality of aspects 602A-Q may have an associated weight 604A-Q. In one embodiment, the weights 604A-Q may include one or more default weights created by the system for the user. In another embodiment, the weights 604A-Q may include one or more custom weights defined by the user.

Figure 7:
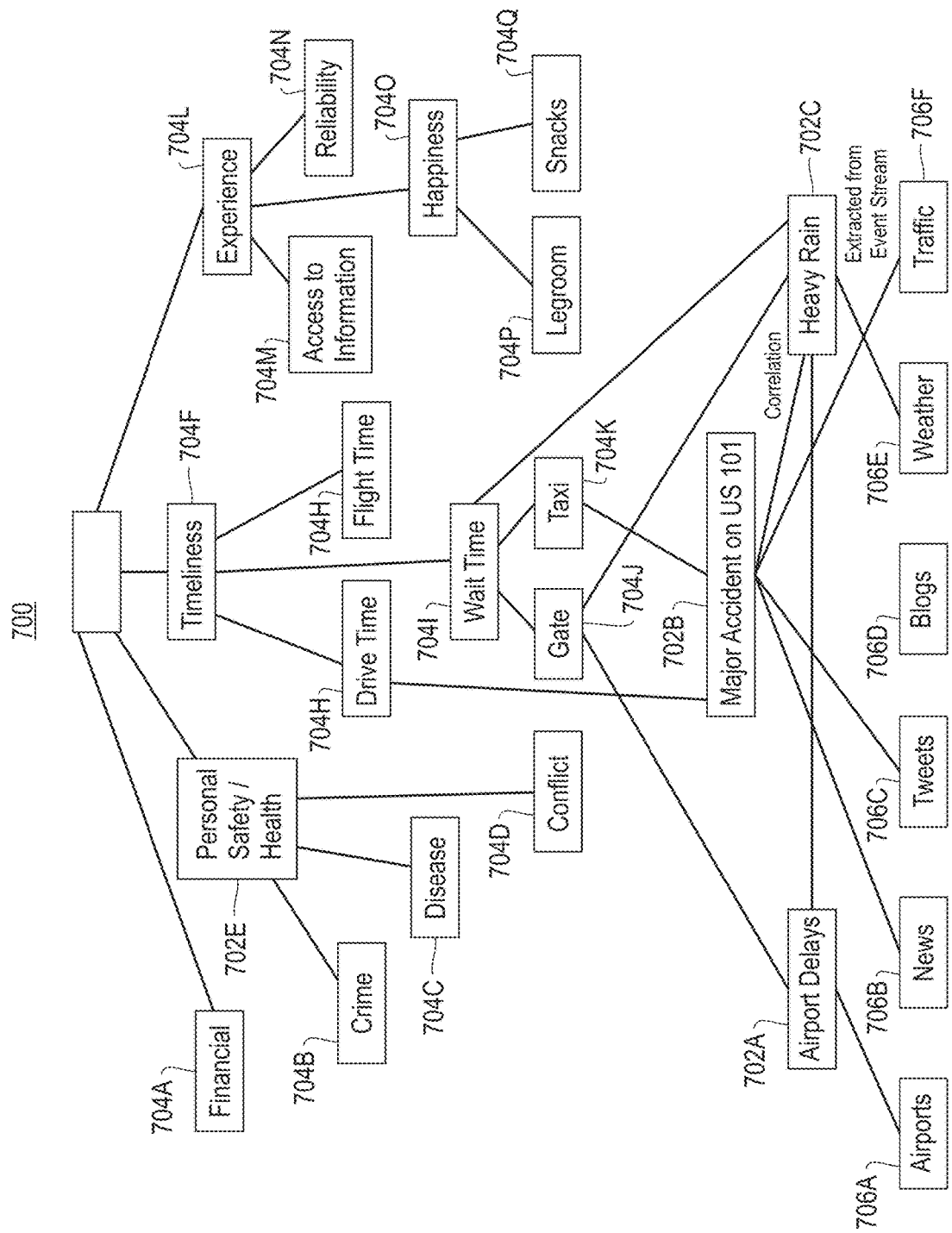
FIG. 7 illustrates an exemplary mapping of a plurality of events to a plurality of aspects within a user profile, in accordance with one embodiment.

FIG. 7 discloses an exemplary mapping 700 of a plurality of events 702A-C to a plurality of aspects 704A-Q within a user profile. As shown, the plurality of events 702A-C are derived from a plurality of sources 706A-F, and are mapped to one or more of the plurality of aspects 704A-Q. Additionally, in one embodiment, aspects 704A-Q having a mapping to one or more of the plurality of events 702A-C may have a greater influence when determining a score for the user.

Figure 8:
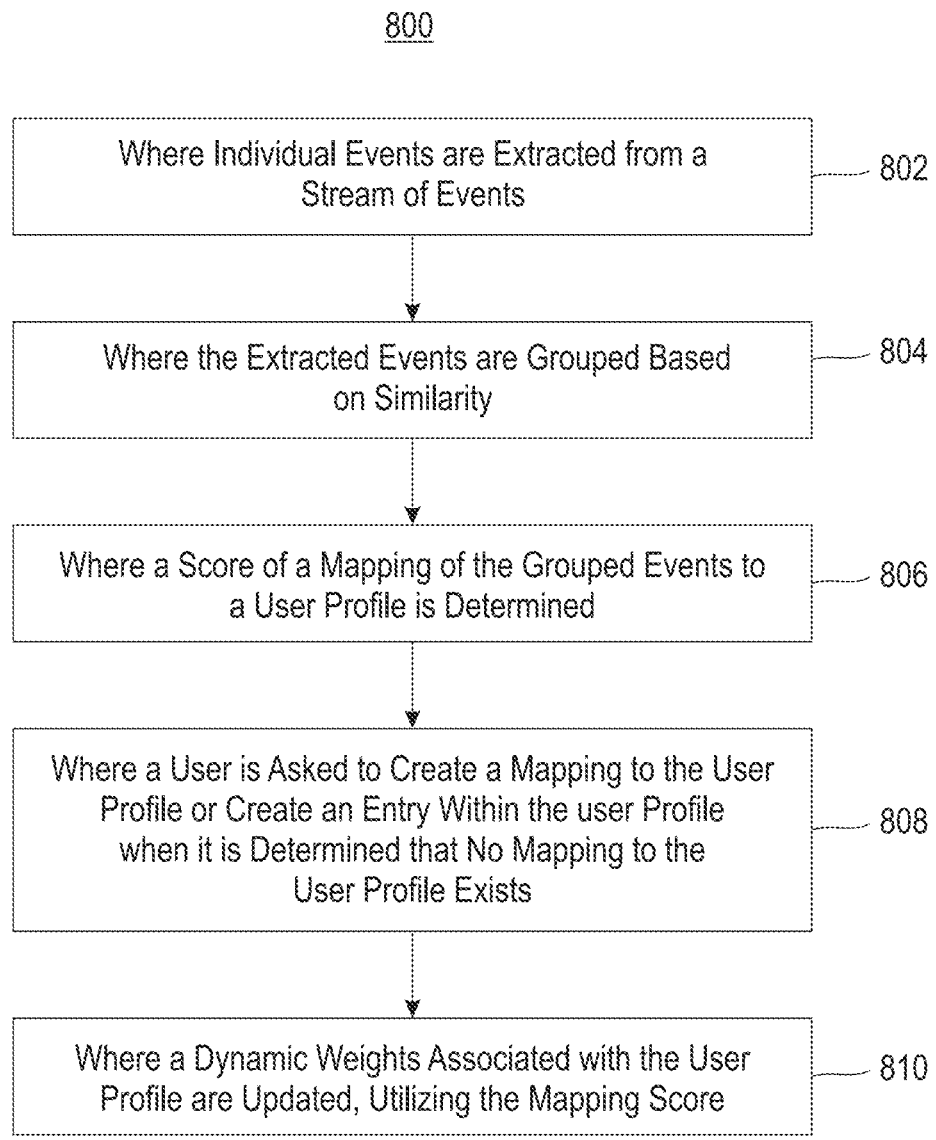
FIG. 8 illustrates a method for enriching a user profile utilizing extracted events, in accordance with one embodiment.

Now referring to FIG. 8, a flowchart of a method 800 for enriching a user profile using extracted events is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where individual events are extracted from a stream of events. In one embodiment, the stream of events may include textual news events, social media postings, etc. Additionally, method 800 may proceed with operation 804, where the extracted events are grouped based on similarity. For example, text similarity scores may be determined between the extracted events, and the extracted events may be grouped based on the determined similarity scores.

Further, method 800 may proceed with operation 806, where a score of a mapping of the grouped events to a user profile is determined. In one embodiment, the score may include a text similarity score. Further still, method 800 may proceed with operation 808, where a user is asked to create a mapping to the user profile or create an entry within the user profile when it is determined that no mapping to the user profile exists. Also, method 800 may proceed with operation 810, where dynamic weights associated with the user profile are updated, utilizing the mapping score.

Table 1 illustrates exemplary weighting update rules. Of course, it should be noted that the rules shown in Table 1 are set forth for illustrative purposes only, and thus should not be construed as limiting in any manner.

TABLE 1

Notation
$w \in R^n$: weight vector initialized by user input
E: set of taxonomy elements
$M \in R^{n \times n}$: weight modification matrix
$M_{i,\cdot}$: i-th row of matrix M
$M_{i,j}$: adjustment of weights from j-th taxonomy element to i-th element when i-th taxonomy element is triggered by event.
$I \in R^{n \times n}$: identity matrix
n: number of taxonomy elements
Update rule
Input: i-th taxonomy element is triggered.
Output: P matrix.
Update: $w \leftarrow Pw$
Implementation
Step 1: Input i-th taxonomy triggered by event
Step 2: Initialization $P \leftarrow I$
    $P_{i,\cdot} \leftarrow M_{i,\cdot}$
    $S = \{j: M_{i,j} \neq 0\}$
    while S is not empty
        for k in S
            $S \leftarrow S - \{k\}$
            $p_{ki} \leftarrow M_{ki}$
            $S \leftarrow S + \{j: M_{ki} \neq 0\}$
        end for
    end while
Step 3: Output P matrix.

Table 2 illustrates an exemplary application of a weighting update. Of course, it should be noted that the application shown in Table 2 is set forth for illustrative purposes only, and thus should not be construed as limiting in any manner.

TABLE 2

If conflict is triggered by Ukraine crisis, then put the weight of conflict to be the sum of other taxonomy elements under Personal Safety/Health elements i, j, k-th taxonomy elements: Crime, Disease, Conflict
$w_i = 0.2, w_j = 0.3, w_k = 0.5$ $$M_{l,m} = \begin{cases} 1, & \text{if } l = k \text{ and } m = i, j, k \\ 0, & \text{otherwise} \end{cases}$$

TABLE 2-continued

Output matrix $P$ from algorithm $$P_{l,\cdot} = \begin{cases} M_{l,\cdot}, & \text{if } l = i, j, k \\ I_{l,\cdot}, & \text{otherwise} \end{cases}$$

Updated weight vector from $Pw$
$w_i = 0.0, w_j = 0.0, w_k = 1.0$

In this way, flexible personal profiling may be implemented for a negative or positive reaction to one or more events. A user may use a default taxonomy or expand the taxonomy by providing a text description of a negative event (and an optional description of a positive event) associated with a taxonomic term that is personal to the user. In one embodiment, there may be no questionnaires that all users must answer. The user may expand the taxonomy as much as desired.

Additionally, a significance of an event may be measured by computing a cosine measure between its text description and that of a negative (or positive) description the user has entered in their personal profile. This significance measure may include a value associated with one part of the taxonomy. Further, weights on all parts of the taxonomy may be learned by observing user choices made after system recommendations.

When the user asks for an explanation for a specific recommendation, each part of the taxonomy that is related to some recent event may be provided with the related event description. The user may also be provided with the weights the system associates with each part.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    creating a profile for a user, the profile including one or more default aspects created automatically by a system and one or more custom aspects created in response to textual input by the user, where for a custom aspect, the textual input includes a textual description of an event;

for each of the one or more custom aspects, deriving an indication of whether the textual description of the event is positive or negative with respect to the custom aspect by analyzing the textual description of the event, and storing the derived indication with the textual description of the event;

comparing event data to the profile to determine a level of correspondence between the event data and each aspect of the profile, including computing a measurement between a text description of the event data and the textual input included within the profile by:

creating a vector space of elements, the elements including phrases and words within the text description of the event data and the textual input included within the profile, placing each of the elements within the vector space where each dimension corresponds to the phrase or word, and a value given to a dimension includes a number of occurrences of that phrase or word, normalizing two points in the vector space to create a sphere, and determining a value indicating how close two elements corresponding to the two points are together based on an angle between the two points;

providing a recommendation to the user, based on the comparing, including, for each aspect of the profile:

modifying the level of correspondence for the aspect according to a weight associated with the aspect, and including one or more proposed actions associated with the aspect in the recommendation in response to determining that the modified level of correspondence for the aspect exceeds a predetermined threshold; and providing a rationale associated with the recommendation to the user.

2. The computer-implemented method of claim 1, wherein comparing the event data to the profile includes:

performing a textual analysis of the event data and a plurality of aspects of the profile, and determining a plurality of quantitative measurements, where for each of the plurality of aspects of the profile, a quantitative measurement is determined indicating the level of correspondence between the aspect and the event data.

3. The computer-implemented method of claim 1, comprising:

monitoring a user to determine whether the one or more proposed actions were performed; and adjusting the weight associated with one or more aspects of the profile, based on the monitoring.

4. The computer-implemented method of claim 1, wherein the textual input by the user includes a bag of words, and the one or more custom aspects are created by:

parsing the bag of words, identifying one or more key words within the bag of words, and creating the one or more custom aspects utilizing the identified key words, where each of the one or more custom aspects include a custom weight defined by the user.

5. The computer-implemented method of claim 1, comprising:

determining one or more actions performed by the user in response to the recommendation; and adjusting the profile in response to determining the one or more actions performed by the user in response to the recommendation, wherein adjusting the profile includes changing one or more weights associated with one or more aspects within the profile.

6. The computer-implemented method of claim 1, wherein the event data includes a description of news, health, and travel events that is received by the system from one or more social media sources.

7. The computer-implemented method of claim 1, wherein the rationale includes:

a description of the event data that was compared to the profile, a description of one or more aspects of the profile for the user having a level of correspondence to the event data that exceeds a predetermined threshold, and a description of one or more weights associated with the aspects.

8. The computer-implemented method of claim 1, wherein comparing the event data to the profile includes:

performing a textual analysis of the event data and a plurality of aspects of the profile, and determining a plurality of quantitative measurements, where for each of the plurality of aspects of the profile, a quantitative measurement is determined indicating the level of correspondence between the aspect and the event data.

9. The computer-implemented method of claim 1, wherein the textual input by the user includes a bag of words, and the one or more custom aspects are created by:

parsing the bag of words, identifying one or more key words within the bag of words, and creating the one or more custom aspects utilizing the identified key words, where each of the one or more custom aspects include a custom weight defined by the user; and further comprising:

monitoring a user to determine whether the one or more proposed actions were performed; and adjusting the weight associated with one or more of the default aspects and custom aspects, based on the monitoring, including:

increasing one or more weights associated with one or more aspects that prompted the recommendation to the user, in response to determining that the user performs the one or more proposed actions, and decreasing one or more weights associated with one or more aspects that prompted the recommendation to the user, in response to determining that the user does not perform the one or more proposed actions.

10. A computer program product comprising one or more non-transitory computer readable storage media, and program instructions collectively stored on the one or more computer readable storage media, the program instructions comprising instructions configured to cause one or more processors to perform a method comprising:

creating a profile for a user, utilizing the one or more processors, the profile including one or more default aspects created automatically by a system and one or more custom aspects created in response to textual input by the user, where for a custom aspect, the textual input includes a textual description of an event;

for each of the one or more custom aspects, deriving, utilizing the one or more processors, an indication of whether the textual description of the event is positive or negative with respect to the custom aspect by analyzing the textual description of the event, and storing the derived indication with the textual description of the event;

comparing event data to the profile to determine a level of correspondence between the event data and each aspect of the profile, utilizing the one or more processors, including computing a measurement between a text description of the event data and the textual input included within the profile by:

creating a vector space of elements, the elements including phrases and words within the text description of the event data and the textual input included within the profile, placing each of the elements within the vector space where each dimension corresponds to the phrase or word, and a value given to a dimension includes a number of occurrences of that phrase or word, normalizing two points in the vector space to create a sphere, and determining a value indicating how close two elements corresponding to the two points are together based on an angle between the two points;

providing, utilizing the one or more processors, a recommendation to the user, based on the comparing, including, for each aspect of the profile:

modifying the level of correspondence for the aspect according to a weight associated with the aspect, and including one or more proposed actions associated with the aspect in the recommendation in response to determining that the modified level of correspondence for the aspect exceeds a predetermined threshold; and providing, utilizing the one or more processors, a rationale associated with the recommendation to the user.

11. The computer program product of claim 10, wherein comparing the event data to the profile includes:

performing a textual analysis of the event data and a plurality of aspects of the profile, and determining a plurality of quantitative measurements, where for each of the plurality of aspects of the profile, a quantitative measurement is determined indicating the level of correspondence between the aspect and the event data.

12. The computer program product of claim 10, comprising:

monitoring a user to determine whether the one or more proposed actions were performed, utilizing the one or more processors; and adjusting, utilizing the one or more processors, the weight associated with one or more aspects of the profile, based on the monitoring.

13. The computer program product of claim 10, wherein the textual input by the user includes a bag of words, and the one or more custom aspects are created by:

parsing the bag of words, utilizing the one or more processors, identifying one or more key words within the bag of words, utilizing the one or more processors, and creating the one or more custom aspects utilizing the identified key words, utilizing the one or more processors, where each of the one or more custom aspects include a custom weight defined by the user.

14. The computer program product of claim 10, comprising determining, utilizing the one or more processors, one or more actions performed by the user in response to the recommendation.

15. The computer program product of claim 14, comprising adjusting, utilizing the one or more processors, the profile in response to determining the one or more actions performed by the user in response to the recommendation.

16. The computer program product of claim 15, wherein adjusting the profile includes changing one or more weights associated with one or more aspects within the profile.

17. The computer program product of claim 10, wherein comparing the event data to the profile includes:

creating a vector space of phrases and or words within the textual input, and placing the event data within the vector space.

18. The computer program product of claim 10, wherein comparing the event data to the profile includes:

performing, utilizing the one or more processors, a textual analysis of the event data and a plurality of aspects of the profile, and determining, utilizing the one or more processors, a plurality of quantitative measurements, where for each of the plurality of aspects of the profile, a quantitative measurement is determined indicating the level of correspondence between the aspect and the event data.

19. A system, comprising:

a hardware processor; and logic integrated with the hardware processor, executable by the hardware processor, or integrated with and executable by the hardware processor, the logic being configured to:

create a profile for a user, the profile including one or more default aspects created automatically by a system and one or more custom aspects created in response to textual input by the user, where for a custom aspect, the textual input includes a textual description of an event;

for each of the one or more custom aspects, derive an indication of whether the textual description of the event is positive or negative with respect to the custom aspect by analyzing the textual description of the event, and storing the derived indication with the textual description of the event;

compare event data to the profile to determine a level of correspondence between the event data and each aspect of the profile, including computing a measurement between a text description of the event data and the textual input included within the profile by:

creating a vector space of elements, the elements including phrases and words within the text description of the event data and the textual input included within the profile, placing each of the elements within the vector space where each dimension corresponds to the phrase or word, and a value given to a dimension includes a number of occurrences of that phrase or word, normalizing two points in the vector space to create a sphere, and determining a value indicating how close two elements corresponding to the two points are together based on an angle between the two points;

provide a recommendation to the user, based on the comparison, including, for each aspect of the profile:

modifying the level of correspondence for the aspect according to a weight associated with the aspect, and including one or more proposed actions associated with the aspect in the recommendation in response to determining that the modified level of correspondence for the aspect exceeds a predetermined threshold; and provide a rationale associated with the recommendation to the user.

* * * * *